United States Patent [19]

Hinderliter

[11] Patent Number: 4,982,925

[45] Date of Patent: Jan. 8, 1991

[54] BATTERY CHARGING SUPPORT APPARATUS

[76] Inventor: Kenneth W. Hinderliter, 809 Maxwell, Wichita, Kans. 67217

[21] Appl. No.: 439,147

[22] Filed: Nov. 20, 1989

[51] Int. Cl.$^5$ .............................................. A47B 97/04
[52] U.S. Cl. ..................................... 248/455; 248/150; 248/188.4; 211/13; 211/60.1
[58] Field of Search .............. 248/455, 454, 446, 447, 248/449, 457, 460, 150, 176; 211/13, 60.1, 74

[56] References Cited

U.S. PATENT DOCUMENTS

| | | |
|---|---|---|
| 2,644,652 | 7/1953 | Hannay . |
| 2,774,563 | 12/1956 | Pribis . |
| 2,834,149 | 5/1958 | Flahive et al. ............... 248/446 X |
| 3,029,548 | 4/1962 | Braha ............................ 248/455 |
| 3,095,666 | 7/1963 | Killen ............................ 248/449 |
| 3,226,077 | 12/1965 | Killen ........................ 248/460 X |
| 3,715,097 | 2/1973 | Kalajian ..................... 248/455 X |
| 3,799,488 | 3/1974 | Sena .......................... 248/460 X |
| 3,948,595 | 4/1976 | Raabe et al. . |
| 4,181,282 | 1/1980 | Oliver et al. ............. 248/460 X |
| 4,305,508 | 12/1981 | Rodgers ........................ 211/13 |
| 4,326,726 | 4/1982 | Dunchock ................. 248/176 X |
| 4,610,414 | 9/1986 | Schuck ........................... 248/449 |
| 4,615,502 | 10/1986 | McLaughlin . |
| 4,738,425 | 4/1988 | Foster . |

*Primary Examiner*—David M. Purol
*Attorney, Agent, or Firm*—Leon Gilden

[57] ABSTRACT

An apparatus is set forth in a first configuration wherein a bottom support is formed with cross-braced plates formed with resilient pad members mounted at corners thereof, with obtusely angled, spaced forward leg portions mounting support pads thereon, with a medial cross-brace positioned medially of a forward plate and extending upwardly and beyond the plate above a rear plate for securement to a cross-brace that has mounted thereto a plurality of vertically spaced members mounting obtusely angled leg supports mounting further pads thereon. A modification thereof includes hinged connnections of the vertical legs and the medial support plate to enable collapse of the organization for transport and storage thereof, as well as providing a degree of flexure. A third embodiment includes an upper support matrix pivotally mounted to a lower support with a threaded connection therebetween to allow adjustment of the upper support to the lower support. A yet further embodiment includes an "H" shaped bottom support with a single mounting plate thereon directed rearwardly and above a center portion of the "H" shaped support mounting an upper cross-brace, wherein each of the aforenoted apparatus are configured for support of a battery charging unit thereon. An associated battery support rack includes a plurality of spaced "W" shaped racks mounting support pads coextensively upon upper surfaces thereof for support spaced elongate batteries thereon during a charging procedure in association with the aforenoted battery charging support racks.

3 Claims, 4 Drawing Sheets

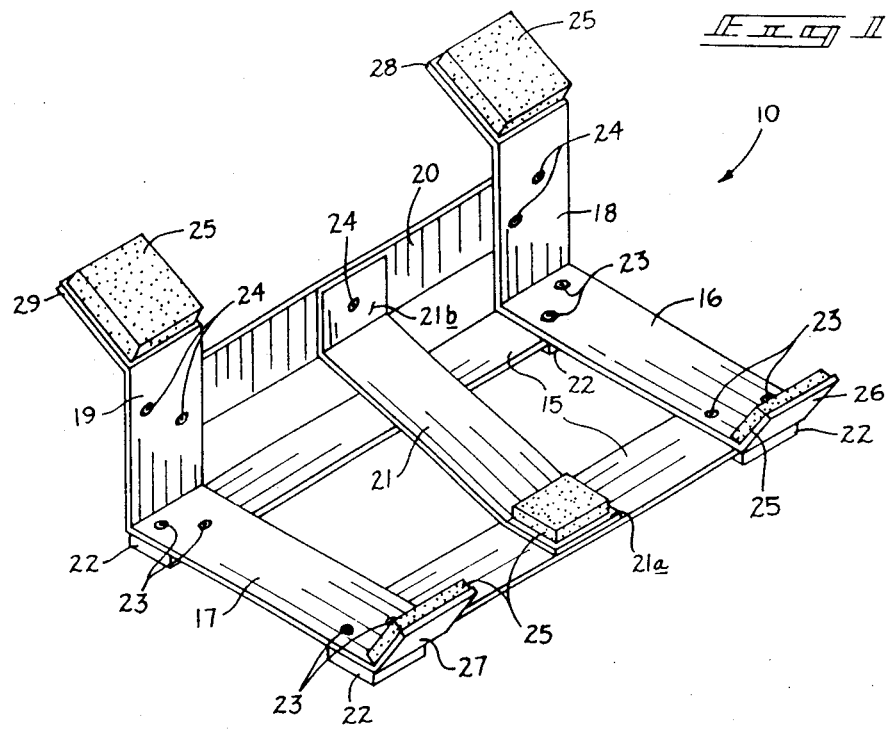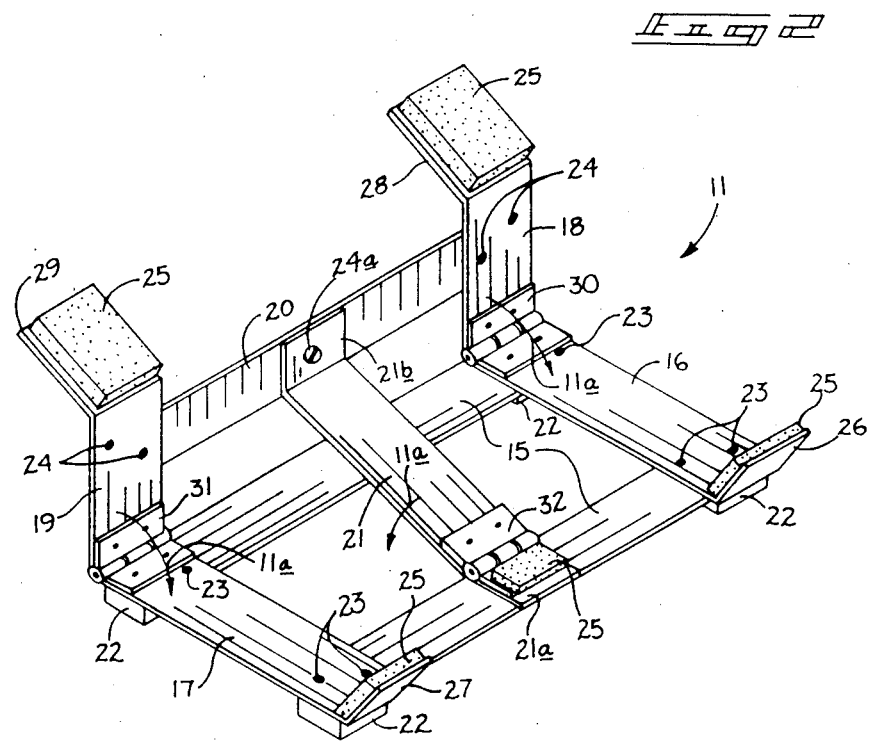

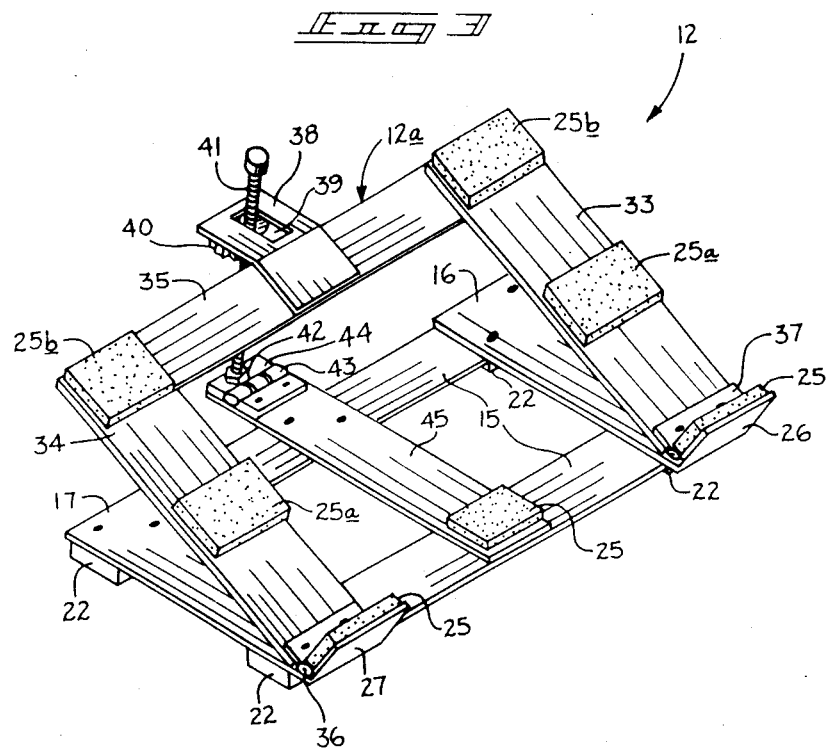
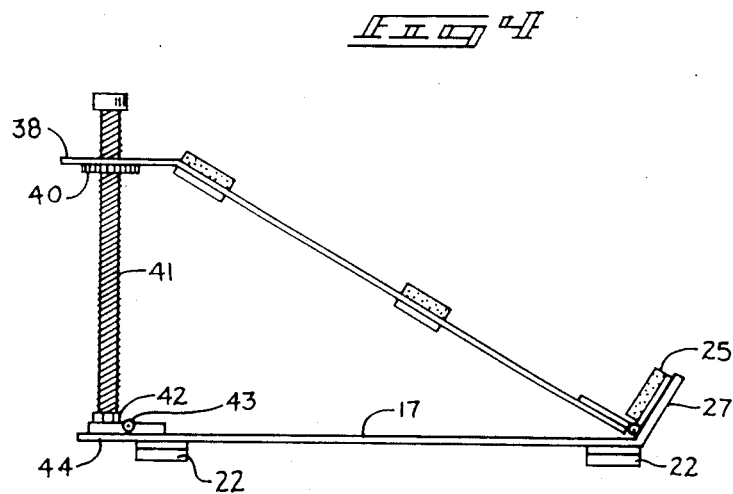

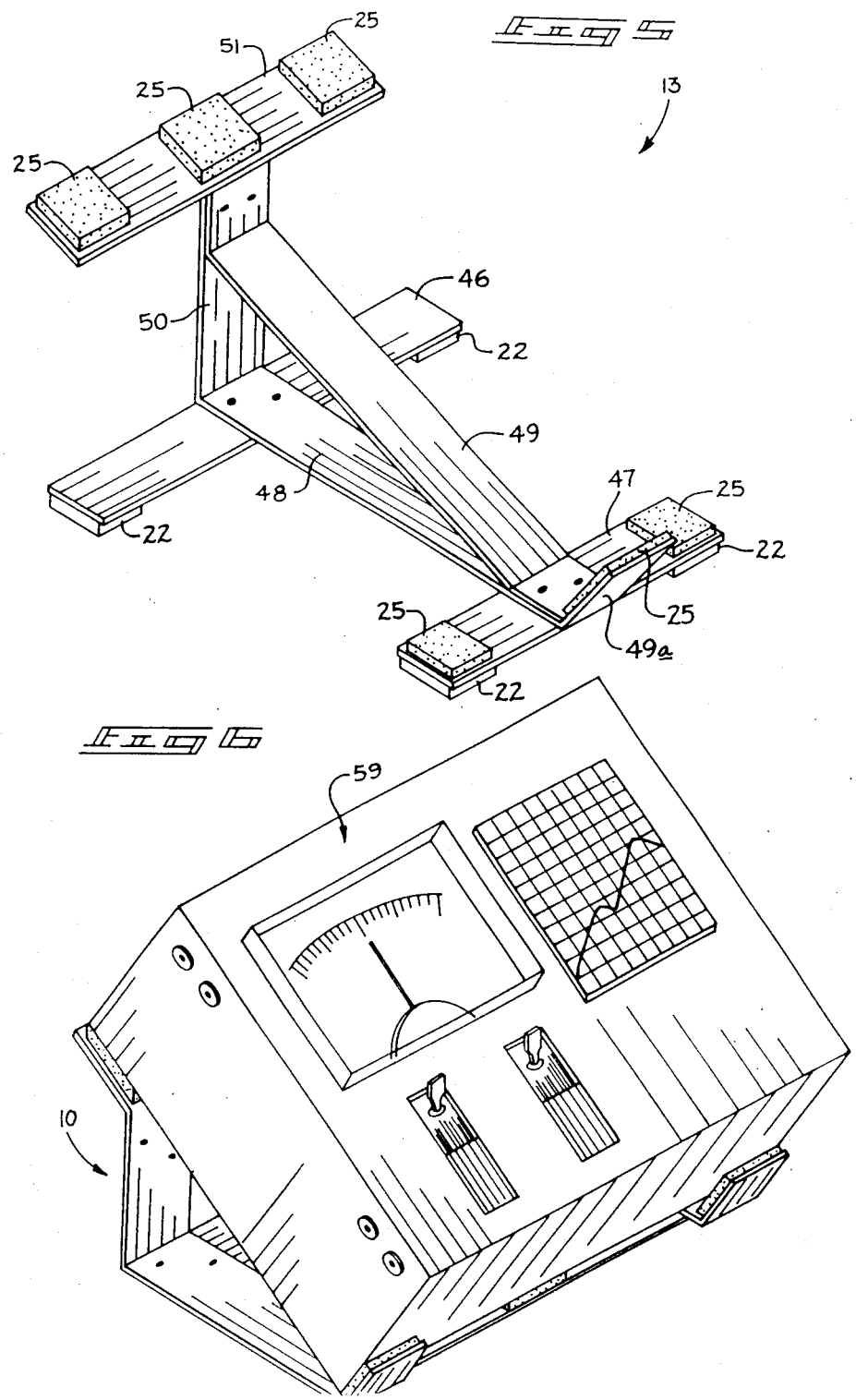

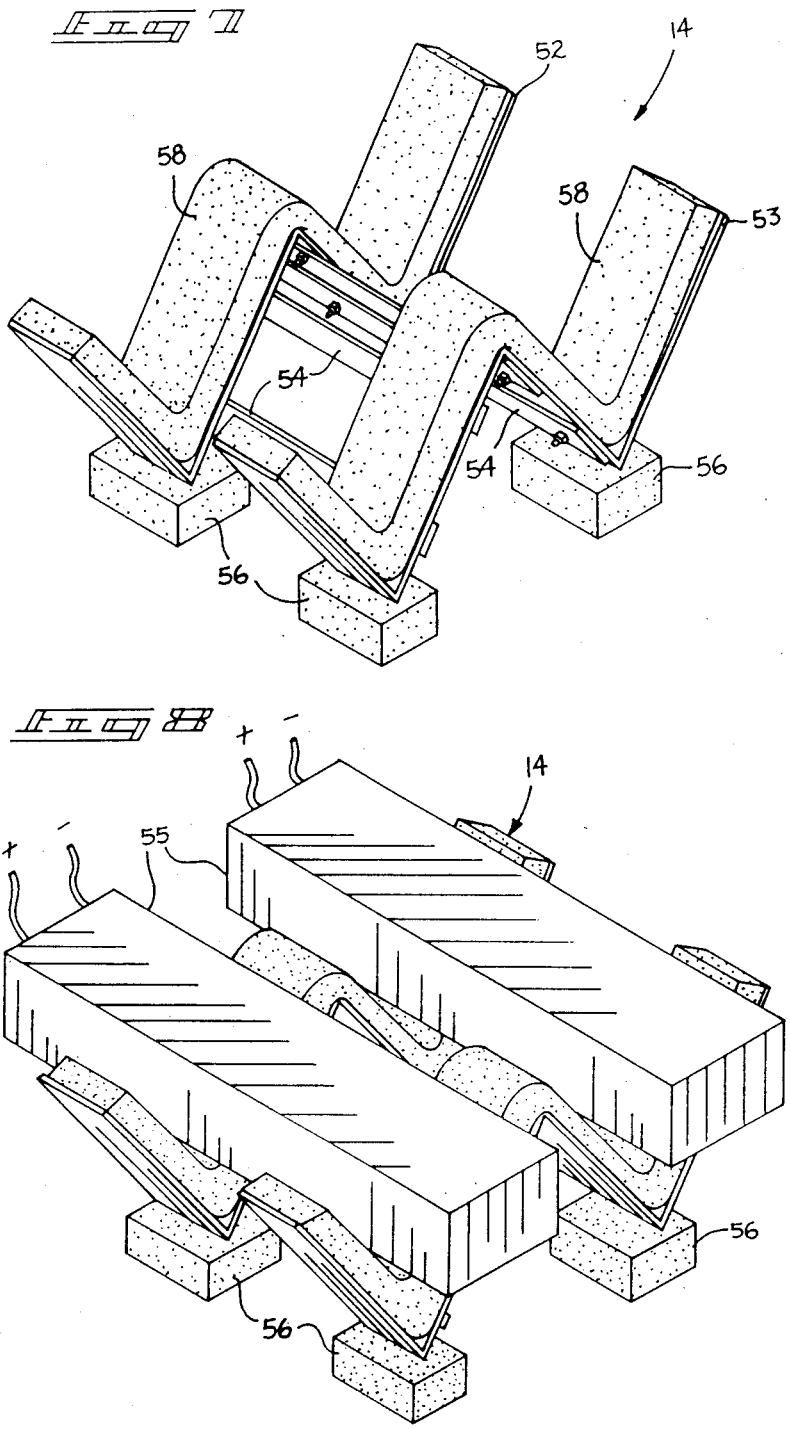

BATTERY CHARGING SUPPORT APPARATUS

BACKGROUND OF THE INVENTION

1. Field of the Invention

The field of invention relates to support rack apparatus, and more particular pertains to a new and improved battery charging support apparatus wherein the same provides a battery charging support rack in association with battery supports to enable enhanced ventilation of the battery charging unit and batteries during a charging procedure, as well as a vibrationless mounting of the battery charger and batteries.

2. Description of the Prior Art

Support racks for support of various items is known in the prior art, wherein support racks are uniquely directed for support of various articles to accommodate a unique problem. The instant invention attempts to overcome deficiencies of prior art devices in providing a unique support for a battery charging unit and associated batteries during a charging procedure to provide enhanced ventilation and air flow about the battery charging unit and batteries, and particularly in use where nickel cadmium batteries are utilized.

Examples of prior art supports include U.S. Pat. No. 4,615,502 setting forth a computer display carrier wherein the display permits radial movement of the computer while providing ventilation thereto during its support.

U.S. Pat. No. 2,644,652 provides a hose reel support wherein spaced plates mount trunnions for support of a cylinder that in turn mounts an elongate resilient hose thereon.

U.S. Pat. No. 3,948,595 to Raabe, et al., sets forth a support for use in annealing of metallic coils providing a plurality of spaced vertical supports and its horizontal cylindrical member permitting the passage of a coil therethrough during annealing procedure.

U.S. Pat. No. 2,774,653 provides for a gun rest wherein a plurality of spaced, hingedly mounted containers each include a vertical brace including a "V" notch for support of an elongate gun thereon.

U.S. Pat. No. 4,738,425 to Foster sets forth a computer printer support comprising an "H" shaped frame, including a pair of parallel support legs with recesses with a plurality of cross-braces thereon, wherein the recesses are provided for reception of castors of an associated printer apparatus.

As such, it may be appreciated that there is a continuing need for a new and improved battery charging support apparatus wherein the same is directed uniquely to the support and vibration-free mounting of a battery charger and associated batteries during a charging procedure and to this extent, the present invention substantially fulfills this need.

SUMMARY OF THE INVENTION

In view of the foregoing disadvantages inherent in the known types of support apparatus now present in the prior art, the present invention provides a battery charging support apparatus wherein the same mounts a battery charging unit and associated batteries in a relatively vibration-free environment while simultaneously supporting air flow about the units minimizing damage to the battery charger and the batteries during a charging procedure. As such, the general purpose of the present invention, which will be described subsequently in greater detail, is to provide a new and improved battery charging support apparatus which has all the advantages of the prior art support apparatus and none of the disadvantages.

To attain this, the present invention includes an apparatus in a first configuration wherein a bottom support is formed with cross-braced plates formed with resilient pad members mounted at corners thereof, with obtusely angled, spaced forward leg portions mounting support pads thereon, with a medial cross-brace positioned medially of a forward plate and extending upwardly and beyond the plate above a rear plate for securement to a cross-brace that has mounted thereto a plurality of vertically spaced members mounting obtusely angled leg supports mounting further pads thereon. A modification thereof includes hinged connections of the vertical legs and the medial support plate to enable collapse of the organization for transport and storage thereof, as well as providing a degree of flexure. A third embodiment includes an upper support matrix pivotally mounted to a lower support with a threaded connection therebetween to allow adjustment of the upper support to the lower support. A yet further embodiment includes an "H" shpaed bottom support with a single mounting plate thereon directed rearwardly and above a center portion of the "H" shaped support mounting an upper cross-brace, wherein each of the aforenoted apparatus are configured for support of a battery charging unit thereon. An associated battery support rack includes a plurality of spaced "W" shaped racks mounting support pads coextensively upon upper surfaces thereof for support of spaced elongate batteries thereon during a charging procedure in association with the aforenoted battery charging support racks.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved battery charging support apparatus which has all the advantages of the prior art support apparatus and none of the disadvantages.

It is another object of the present invention to provide a new and improved battery charging support apparatus which may be easily and efficiently manufactured and marketed.

It is a further object of the present invention to provide a new and improved battery charging support apparatus which is of a durable and reliable construction.

An even further object of the present invention is to provide a new and improved battery charging support apparatus which is susceptible of a low cost of manufacture with regard to both materials and labor, and which accordingly is then susceptible of low prices of sale to the consuming public, thereby making such battery charging support appartus economically available to the buying public.

Still yet another object of the present invention is to provide a new and improved battery charging support apparatus which provides in the apparatuses and methods of the prior art some of the advantages thereof, while simultaneously overcoming some of the disadvantages normally associated therewith.

Still another object of the present invention is to provide a new and improved battery charging support apparatus wherein the same mounts fixedly, or alternatively in an adjustable manner, a battery charging unit for enhanced ventilation and vibration-free support of the unit in association with a plurality of batteries in a spaced, cushioned unit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a battery charging support apparatus.

FIG. 2 is an isometric illustration of a second battery charging support apparatus.

FIG. 3 is an isometric illustration of a third battery charging support apparatus.

FIG. 4 is an orthographic side view taken in elevation of the battery charging support apparatus of FIG. 3.

FIG. 5 is an isometric illustration of a forth battery charging support apparatus.

FIG. 6 is an isometric illustration of the battery charging support apparatus of FIG. 1 in association with a battery charger unit.

FIG. 7 is an isometric illustration of the battery support rack utilized by the instant invention.

FIG. 8 is an isometric illustration of the various support rack of FIG. 7 in support of a plurality of spaced, elongate batteries thereon.

DESCRIPTION OF THE PREFERRED EMBODIMENT

With reference now to the drawings, and in particular to FIGS. 1 to 8 thereof, a new and improved battery charging support apparatus embodying the principles and concepts of the present invention and generally designated by the reference numerals 10, 11, 12, 13, and 14 will be described.

More specifically, the battery charging support apparatus 10, as illustrated in FIG. 1, essentially comprises a plurality of spaced, planar elongate base plates 15 with an upper first end support plate 16 and a second lowermost end support plate 17 orthogonally mounted to the spaced base plates 15 to provide a rectangular support configuration, with a respective first and second positioning plate 18 vertically and orthogonally mounted to rearwardmost ends of the first and second end support plates 16 and 17 respectively, with a cross-brace 20 fixedly mounted to rear surfaces of the first and second positioning plates 18 and 19. A medial support bar 21 is formed with a forward leg 21a fixedly mounted medially of an upper surface of a forward base plate 15 with the support bar 21 extending rearwardly of the forward support plate 15 to a position above the rear support plate 15 for fixed securement medially of the cross-brace 20, with a rear leg 21b mounted to the cross-brace 20. Resilient pad members 22 are mounted to spaced terminal ends of the spaced base plates 15 to provide a cushioning and minimizing of vibration to a battery charger support within the support apparatus 10. Pad fasteners 23 are directed through the first and second end plates 16 and 17 downwardly thereof to secure the pad members 22. A first pad leg support 26 and a second pad leg support 27 are each mounted at obtuse angles relative to forward terminal ends of the respective first and second end support plates 16 and 17 with associated cushion pads mounted thereon, with a third and fourth pad leg support 28 and 29 respectively mounted at obtuse angles relative to upper terminal ends of the first and second positioning plates 18 and 19, with cushion pads 25 mounted thereon to provide a cushion support of a battery charger thereon. It is noted that a further cushion pad 25 is mounted to an upper surface of the forward leg 21a. Support of a battery charger unit 59 to the support apparatus 10, is illustrated in FIG. 6 for example.

FIG. 2 is illustrative of a second battery charging support apparatus 11 of comparable structure to that as illustrated in FIG. 1, but enabling relative flexure between selective joints of the organization, as well as accommodating a collapsing of the structure in the direction of the arrows 11a to enable a collapsing and interfolding of the organization for transport and storage thereof. Accordingly, rearendmost portions of the first and second end support plates 16 and 17 and their intersection with the first and second positioning plates 18 and 19 are accommodated by first and second respective pivotal hinges 30 and 31. A third pivotal hinge 32 is mounted between the medial support bar 21 and its forward leg 21a. A removable fastener 24a, such as use of threads and the like, mounts and secures the rear leg 21b to the cross-brace 20, whereupon removal of the fastener 24b, the medial support bar 21 is pivoted downwardly, whereupon the first and second positioning plates 18 and 19 are subsequently pivoted downwardly to provide a compact organization.

FIG. 3 is illustrative of a third battery charging support apparatus 12. A lower support structure of a generally rectangular configuration is defined by the spaced base plates 15 mounting the first and second end support plates 16 and 17 thereon, with the resilient pad members 22 at corners thereof in a manner as illustrated in the embodiments 10 and 11 as set forth in FIGS. 1 and 2 respectively. Also as in the embodiments as set forth in FIGS. 1 and 2, the first and second pad leg supports 26 and 27 are integrally formed at obtuse angles relative to the respective first and second end support plates 16 and 17. An upper support frame 12a is pivotally mounted to the lower support frame and includes a first plate member 33 spaced from a second plate member 34 at a predetermined distance equal to the spacing of the first and second end support plates 16 and 17. Forwardmost ends of the first and second plate members 33 and 34 are pivotally mounted at the intersection of the respective first and second end support plates 16 and 17 with the first and second pad leg supports 26 and 27. A plurality of pads including medial pads 25a and end pads 25b are mounted on respective medial portions of the first and second plate members 33 and 34. A third plate member 35 joins the first and second plate members at rearwardmost ends thereof, with a mounting plate 38 positioned orthogonally and integrally to the third plate member 35, with the mounting plate 38 extending rearwardly thereof and including a mounting slot 39 longitudinally formed within the mounting plate 38, with the slot 39 orthogonally aligned relative to the third plate member 35. A slidably mounted nut member 40 is mounted slidingly to and underlying the mounting plate 38, with a threaded adjusting rod 41 threadedly mounted therethrough, with the adjusting rod 41 including a swivel mounted foot 42 formed at a lowermost end thereof pivotally mounted to a foot plate 44. An adjustment hinge 43 secures the foot plate 44 to a cross-plate 45 extending orthogonally across and integrally mounted to the spaced base plates 15. It may be appreciated therefore that relative rotation of the threaded adjusting rod 41 pivotally tilts the upper support frame 12a relative to the lower framework to adjustably position a battery charger 52 and may be mounted thereon.

FIG. 5 is illustrative of a fourth battery charging support apparatus 14 provided with a rear support plate 46, a forward support plate 47, and an intermediate connector plate 48 to define a generally "H" shaped framework, with resilient pad members 22 mounted at bottommost end portions of the rear and forward support plates 46 and 47. A mounting plate 49 includes a leg support 49a mounted at an obtuse angle thereto mounting a cushion pad 25 thereon, wherein the mounting plate 49 extends rearwardly and upwardly of the connector plate 48 with a terminal end of the mounting plate 49 aligned with a rear terminal end of the connector plate 48, with a vertical support plate 50 integrally and orthogonally mounted to the rear support plate 46 and integrally mounted to the mounting plate 49 for support of a battery charging unit 59 mounted thereon. A top support plate 51 is mounted medially of the vertical support leg 50 at an upper end thereof and includes a series of cushion pads 25 mounted thereon.

FIGS. 7 and 8 are illustrative of the battery support rack 14 utilized by the instant invention defining a first and second "W" shaped supports 52 and 53 respectively, with battery support braces 54 integrally securing the first and second "W" shaped supports 52 and 53 together in a spaced, parallel relationship. A surface cushion 58 is coextensive with and overlies upper surfaces of the first and second "W" shaped supports 52 and 53, with cushion mounts 56 mounted to lower apex portions of the "W" shaped supports 52 and 53 to provide cushioning of batteries 55 mounted thereon. Typically, nickel cadmium batteries are utilized and due to their expense and need to prolong their life, the cushioning and air flow available during a charging procedure enhances the life and use of the batteries in a charging procedure.

As to the manner of usage and operation, it should be apparent that the battery charging support apparatus 10, 11, 12 or 13 are selectively utilized with the battery support rack 14 to provide charging of the associated batteries 55. The positioning and angulation of the battery charging unit 59 enhances its use by the advantageous orientation of the meters and switches mounted upon the forward face thereof, as well as providing enhanced cooling by virtue of air circulation about the unit, as well as the batteries when secured upon the respective support rack 14.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A battery charging support apparatus comprising in combination,
   a support framework including first and second base plates of equal and finite length spaced parallel to one another with first and second end support plates integrally and orthogonally mounted to respective upper forward and rear surfaces of the first and second base plates, with resilient cushion members mounted to bottom forward and rear surfaces of the first and second base plates, and
   an upper framework mounted to and extending above the support framework for support of a battery charging unit thereon, and
   wherein the upper framework includes first and second plate members of equal predetermined length spaced parallel to one another with a predetermined length equal to or greater than a predetermined length defined by the first and second end support plates, and forward terminal ends of the respective first and second plate members are hingedly mounted to forward terminal ends of the first and second end support plates, and the first and second plate members include a a plurality of cushion pads mounted thereon,
   and
   wherein forward terminal ends of the first and second end support plates each include a leg support plate fixedly mounted at an obtuse angle to the first and second end support plates, and including a cushion pad mounted to an upper surface of the leg support members, and a third plate member integrally mounted to a bottom surface securing rear terminal end portions of the first and second plate members together, wherein the third plate member is orthogonally aligned relative to the first and second plate members, and the first, second and third plate members define the upper framework pivotally mounted to the support framework, and including a mounting plate integrally and orthogonally secured medially of the third plate member extending rearwardly thereof and including an elongate slot, wherein the elongate slot is orthogonally aligned relative to the third plate member, and a threaded rod extending through the elongate slot and threadedly mounted within a sliding nut member slidably mounted to a bottom surface of the mounting plate, and the threaded rod extending downwardly through the sliding nut member and pivotally secured to a foot plate, the foot plate pivotally mounted to a cross-plate, the cross-plate medially and orthogonally mounted to upper surfaces of the first and second base plates whereupon rotation of the threaded rod member pivotally adjusts the upper framework relative to the support framework.

2. A battery charging support apparatus as set forth in claim 1 further including a battery support rack, wherein the battery support rack comprises a plurality of "W" shaped supports, with cushion mounts mounted to lower apex portions defined by each of the "W" shaped supports, and a plurality of further braces securing the "W" shaped supports at a spaced parallel relationship relative to one another.

3. A battery charging support apparatus as set forth in claim 2 wherein each "W" shaped support includes a surface cushion formed coextensively with and secured to respective upper surfaces of the first and second "W" shaped supports for resiliently mounting elongate batteries within spaced arms defined by the "W" shaped supports.

* * * * *